US005787396A

United States Patent [19]
Komori et al.

[11] Patent Number: 5,787,396
[45] Date of Patent: Jul. 28, 1998

[54] SPEECH RECOGNITION METHOD

[75] Inventors: Yasuhiro Komori, Kawasaki; Yasunori Ohora, Yokohama; Masayuki Yamada, Kawasaki, all of Japan

[73] Assignee: Canon Kabushiki Kaisha, Tokyo, Japan

[21] Appl. No.: 529,436

[22] Filed: Sep. 18, 1995

[30] Foreign Application Priority Data

Oct. 7, 1994 [JP] Japan ................................ 6-244005

[51] Int. Cl.⁶ ........................... G10L 5/06; G10L 9/00
[52] U.S. Cl. ............................... 704/256; 704/255
[58] Field of Search ........................ 704/256, 243, 704/244, 245, 255

[56] References Cited

U.S. PATENT DOCUMENTS 5,289,562  2/1994  Mizuta et al. ........................ 381/41

FOREIGN PATENT DOCUMENTS

0533491A2  3/1993  European Pat. Off.
0560378A1  9/1993  European Pat. Off.

OTHER PUBLICATIONS

Isobe T, Murakami K, Teleph. Speech Data Corpus and Perf. of Speaker Indep. Recog. Sys. Using the Corpus, IEEE IVTTA pp. 101–104, Sep. 1994.

Kannan A et al, Maximum Likelihood Clustering of Gaussians for Speech Recognition, IEEE Trans. on Speech and Audio Proc., vol. 2 No. 3 pp. 453–455, Jul. 1994.

Itou K et al, Cont. Speech Recog. by Context–Dependent Phonetic HMM and an Efficient Alg. for finding N–Best Sentence Hypoth., IEEE ASSP vol. 1 pp. I21–I24, Mar. 1993.

Bocchieri E, et al, Vector Quantization for the Efficient Computation of Continuous Density Likelihood, IEEE ASSP vol. 2 pp. II692–II695, Apr. 1993.

*Primary Examiner*—David R. Hudspeth
*Assistant Examiner*—Robert Louis Sax
*Attorney, Agent, or Firm*—Fitzpatrick, Cella, Harper & Scinto

[57] ABSTRACT

A speech recognition method uses continuous mixture Hidden Markov Models (HMM) for probability processing including a first type of HMM having a small number of mixtures and a second type of HMM having a larger number of mixtures. First output probabilities are formed for inputted speech using the small number of mixtures type HMM and second output probabilities are formed for the input speech using the large number of mixtures type HMM for selected states corresponding to the highest output probabilities of the first type HMM. The input speech is recognized from both the first and second output probabilities.

27 Claims, 8 Drawing Sheets

SPEECH RECOGNITION METHOD

BACKGROUND OF THE INVENTION

1. Field of the Invention

The present invention relates to a speech recognition method for recognizing unknown speech input.

2. Description of the Related Art

Along with the substantial increase in computing power of workstations and personal computers, a high-speed speech recognition system can be constructed through use of software only. Most speech recognition systems, which are targeted for recognizing unspecified speakers, large vocabularies and continuous speech, employ a HMM (Hidden Markov Model) which is considered to be the most effective statistical model at the moment. However, although computers have become much faster, it is still not easy to construct a speech recognition system of the type which is adequate to process recognition of unspecified speakers in real time, large vocabularies and continuous speech with only software. It is thus still important to speed up the speech recognition processing.

To realize faster speech recognition processing by use of the HMMs, it is required to increase the speed of the following three factors: 1) sound processing; 2) output probability computation; and 3) language space searching. In particular, speech recognition systems using continuous mixture HMMs for output probability computation (hereinafter referred to as "the continuous HMMs), which are now being extensively studied, require much greater computation in comparison with speech recognition systems using discrete HMMs for output probability computation. Accordingly, for the practical use of a speech recognition system which is able to recognize unspecified speakers, large vocabularies and continuous speech in real time using the continuous HMMs, a reduction in the amount of the output probability computation is essential.

The computation load of the continuous HMMs is proportional to the total number of mixtures (the total number of mixtures=the number of HMMs×the number of states in each HMM×the number of mixtures in each state). In general, the following is applied to speech recognition performed using the continuous HMMs if sufficient training data is given. A larger number of mixtures results in the better recognition accuracy but a larger amount of computation is required. Conversely, a smaller number of mixtures requires less calculation, but results in lower recognition accuracy. Accordingly, it is necessary to reduce the total number of mixtures provided for calculation without deteriorating the recognition accuracy.

SUMMARY OF THE INVENTION

The above-described problem can be solved based on the concept that clusters which appear to contribute to the recognition results are evaluated in detail, whereas clusters which do not appear to contribute to the recognition results are roughly evaluated. Accordingly, based on the aforementioned concept, it is an object of the present invention to provide a speech recognition method in which the output probability processing by use of the continuous HMMs is made faster by reducing the total number of mixtures provided for calculation without deteriorating the recognition accuracy.

In order to achieve the above-described object, the present invention provides the following speech recognition method. States of an HMM which are likely to contribute to the recognition results are first estimated by use of an HMM having a small number of mixtures which requires only a small amount of output probability computation. Then, only the output probabilities of the estimated states are re-calculated by use of the states of an HMM having a large number of mixtures, resulting in a high rate of recognition accuracy. According to this method, the total number of mixtures provided for actual computation can be reduced.

In this invention, at least two types of HMMs are employed for the HMMs in the same class.

One type of HMM is a rough HMM which requires only a small amount of computation and also results in a satisfactory rate of recognition accuracy (for example, a HMM having a small number of mixtures). The other type of HMM is a detailed HMM which requires a large amount of computation and obtains a high rate of recognition accuracy (for example, a HMM which has a large number of mixtures). In this invention, the two types of HMMs are identical in structure (topology) so that the respective states of one type can correspond to the respective states of the other type. The output probabilities of the former states are thus related to those of the latter states in a certain fixed manner, and the output probabilities are exchangeable between the two types of HMMs.

The output probabilities of classes and their states and mixtures which are likely to contribute to the recognition results are first determined by use of the rough HMM. As a result of the rough HMM processing, the top N classes and their states and mixtures exhibiting the highest output probabilities are determined, or alternatively, the classes and their states and mixtures having the output probabilities greater than the threshold that are likely to contribute to the recognition results are determined.

Subsequently, for re-calculating the precise output probability by use of the detailed HMM, it is determined that the top M classes and their states and mixtures exhibiting the highest output probabilities, obtained by the previous calculations by use of the rough HMM, are likely to contribute to speech recognition. Then, the output probabilities of the top M classes and their states and mixtures are re-calculated by use of the detailed HMM. If required, further processing of the output probabilities is performed using a more detailed HMM of the top N classes or their states and mixtures having the highest probabilities obtained by the calculations by the detailed HMM (N<M). Accordingly, the more precise output probability can be obtained according to the aforementioned process in a plurality of stages.

Alternatively, the precise output probability is determined by use of the two steps of detailed HMM. The output probabilities of the top range from N to M classes and their states and mixtures (N<M) are calculated by use of the comparatively-detailed HMM. Then, the output probabilities of the top N classes or their states and mixtures exhibiting the highest output probabilities obtained by the rough HMM are similarly calculated by use of the more detailed HMM. As a result, the more precise output probability can be obtained according to the aforementioned process in two stages.

In this invention, two types of HMMS, that is, a phonemic context-independent HMM and a phonemic context-dependent HMM in which a phoneme is dependent on a plurality of surrounding phonemes, are employed for the same phoneme of HMMs.

In this invention, the two types of HMMs are identical in structure (topology). Also, the respective states of one type can correspond to the respective states of the other type. The output probabilities of the former states are thus related to those of the latter states in a certain fixed manner, and the output probabilities are exchangeable with each other between the two types of HMMs.

The output probabilities of phonemes and their states and mixtures which are likely to contribute to the recognition results are first determined by use of the phonemic context-independent HMM. As a result, the top N phonemes and their states and mixtures exhibiting the highest output probabilities are determined. Alternatively, the phonemes and their states and mixtures having the output probabilities greater than a threshold that are likely to contribute to the recognition results are determined.

Subsequently, for re-calculating the precise output probability by use of the phonemic context-dependent HMM, the top N phonemes and their states and mixtures exhibiting the highest output probabilities, obtained by the previous calculations by use of the phonemic context-independent HMM that are likely to contribute to the speech recognition are determined. Then, the output probabilities of the top N phonemes and their states and mixtures are re-calculated by use of the phonemic context-dependent HMM. Accordingly, the most precise output probability can be obtained according to the aforementioned process in a plurality of stages.

As the present invention is constructed as described above, the output probability computation can easily become faster without reducing recognition accuracy. Additionally, the following advantages can be obtained:

1. achieving easy HMM training according to a conventional method;

2. suitability for real-time processing and easily built into the conventional Viterbi Search and the like;

3. having the possibility of gaining performance as good as the performance obtained by use of only the detailed HMM or the phonemic context-dependent HMM;

4. simple determination of the number of states provided for output probability computation;

5. substantial reduction in the total number of states according to the type of combination of rough and detailed HMMs or combination of phonemic context-independent and context-dependent HMMs; and 6. very small computational overhead (calculations for determining the top state having the highest output probability and estimate calculation for the top state having the highest output probability obtained by use of the rough HMM or the phonemic context-independent HMM).

Further objects, features and advantages of the present invention will become apparent from the following description of the preferred embodiments with reference to the attached drawings.

DETAILED DESCRIPTION OF THE PREFERRED EMBODIMENTS

First Embodiment

Figure 1:
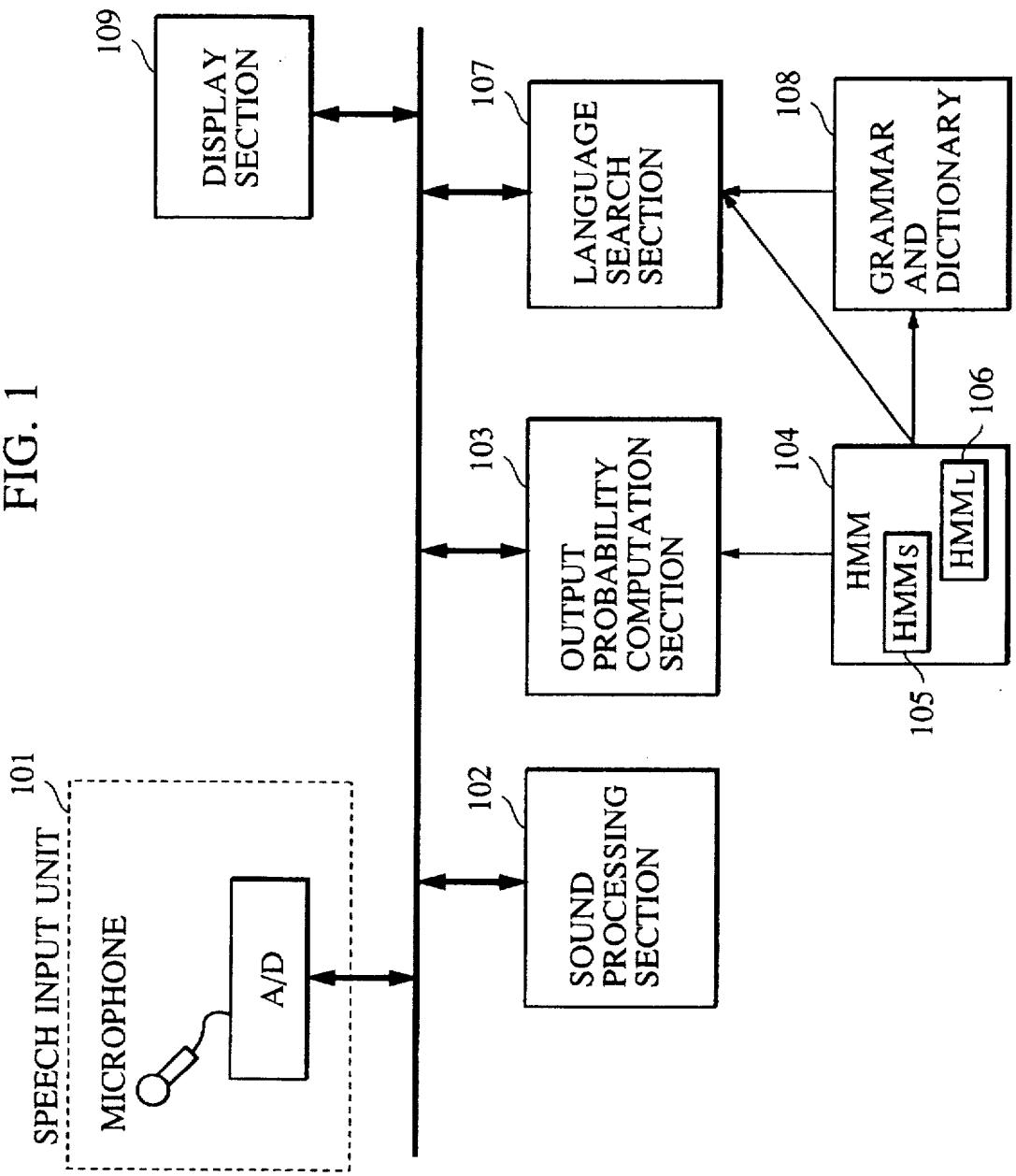
FIG. 1 is a block diagram of a first embodiment of the present invention.

FIG. 1 is a block diagram illustrating a speech recognition system according to a first embodiment of the present invention.

The speech recognition system includes: a speech input unit 101 including an A/D converter and a microphone through which unknown speech is input; a sound processing section 102 for determining voice parameters from the voice which is input from the voice input unit 101; an output probability processing section 103 for determining the output probability by comparing the voice parameters obtained in the sound processing section 102 with HMMs which are used as dictionary data for speech recognition; an HMM storing section 104 used as a dictionary section for speech recognition in which the output probabilities are calculated; an $HMM_s$ storing portion 105 for storing rough HMMs, that is, $HMM_s$s, used for estimating how much a phoneme will contribute to the recognition of the input voice; an $HMM_L$ storing portion 106 for storing detailed HMMs, that is, $HMM_L$s, for calculating the precise output probability; a language search section 107 for executing language processing; a grammar and dictionary section 108 in which a grammar and a dictionary used for the language processing are stored; and a display section 109 or displaying the speech recognition results in the form of character strings.

Figure 2:
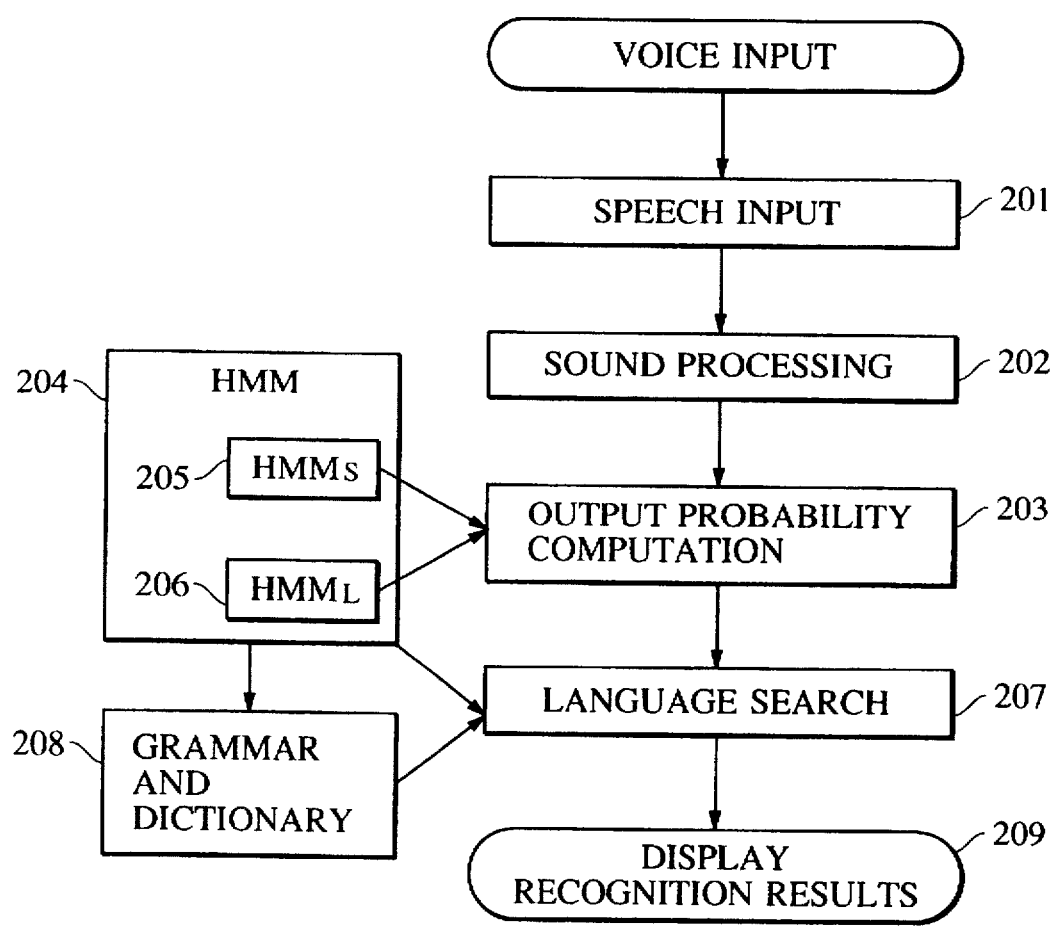
FIG. 2 is a flow chart of a process executed in the first embodiment of the present invention.

The speech recognition system constructed as described above is operated according to the flow shown in FIG. 2. The speech supplied from the speech input section 101 (step 201) is analyzed and processed into speech parameters in the sound processing section 102 (step 202). The output probability is determined in the output probability computation section 103 (step 203) by use of a rough $HMM_s$ stored in the $HMM_s$ storing portion 105 (step 205) contained in a HMM stored in the HMM storing section 104 (step 204). Further, the states of the HMM of the phoneme which are likely to contribute to the recognition results are determined. The precise output probabilities are re-determined by use of a detailed $HMM_L$ stored in the $HMM_L$ storing portion 106 corresponding to the states of the phoneme which have been determined to contribute to the recognition results in step 205 (step 206). According to the thus-obtained precise output probabilities, the language processing is performed in the language search section 107 (step 207) by use of the grammar and dictionary stored in the grammar and dictionary 108 section (step 208). The language processing reflects the data stored in HMM storing section 104. Finally, the recognition results are output to the display section 109 (step 209).

The first embodiment will now be explained in detail.

In this embodiment, classes which are likely to contribute to the recognition results are first estimated by use of the $HMM_s$s having the smaller number of mixtures (smaller number of mixture HMMs). Then, only the estimated classes are re-calculated by use of the $HMM_L$s having the large number of mixtures (large number of mixture HMMs). As explained above, the large number of mixture HMMs are advantageous because they exhibit higher recognition accuracy, but are disadvantageous because they require a larger amount of computation. This method eliminates the necessity of calculating all the phonemes by use of the $HMM_L$s, which reduces the total number of mixtures provided for the actual calculations, thereby achieving the faster speech recognition.

This method is easily applicable if the HMM is formed of only a single state. However, an HMM formed of only one single state is not used very much because an HMM used for the speech recognition represents a change in the time sequence of the feature sequence in the model. It is also known that high performance cannot be obtained from an HMM formed of only one single state. The suitable number of states in an HMM for obtaining high performance is generally a plurality of (e.g., three or four) states, and thus, HMMs each formed of three or four states are most widely used. However, the following problem is encountered with this type of HMM. That is, the maximum likelihood estimator of the class of the HMM, which is determined by the output probability of each state and the state transition probability between the states, disadvantageously varies depending on the duration of each state, and it is thus difficult to obtain the overall maximum likelihood estimator of the HMM. Accordingly, it is not easy to uniformly make a comparison for determining HMMs which are likely to contribute to the recognition results. This problem can be solved by carrying out the following assumption. Based on this assumption, the idea of an HMM state is introduced instead of the above-described classes, and the foregoing basic concept is still applicable to the HMM state.

HMMs are trained in comparatively-short units, such as a phoneme. All the HMMs are formed of a simple left-to-right structure with several states, for example, three states. Under these conditions, even if the different HMMs having different numbers of mixtures are independently trained, the related states of the different HMMs become substantially equal and thus represent substantially similar features. As a consequence, the respective states of the different HMMs having different number of mixtures can be related to each other.

Figure 3:
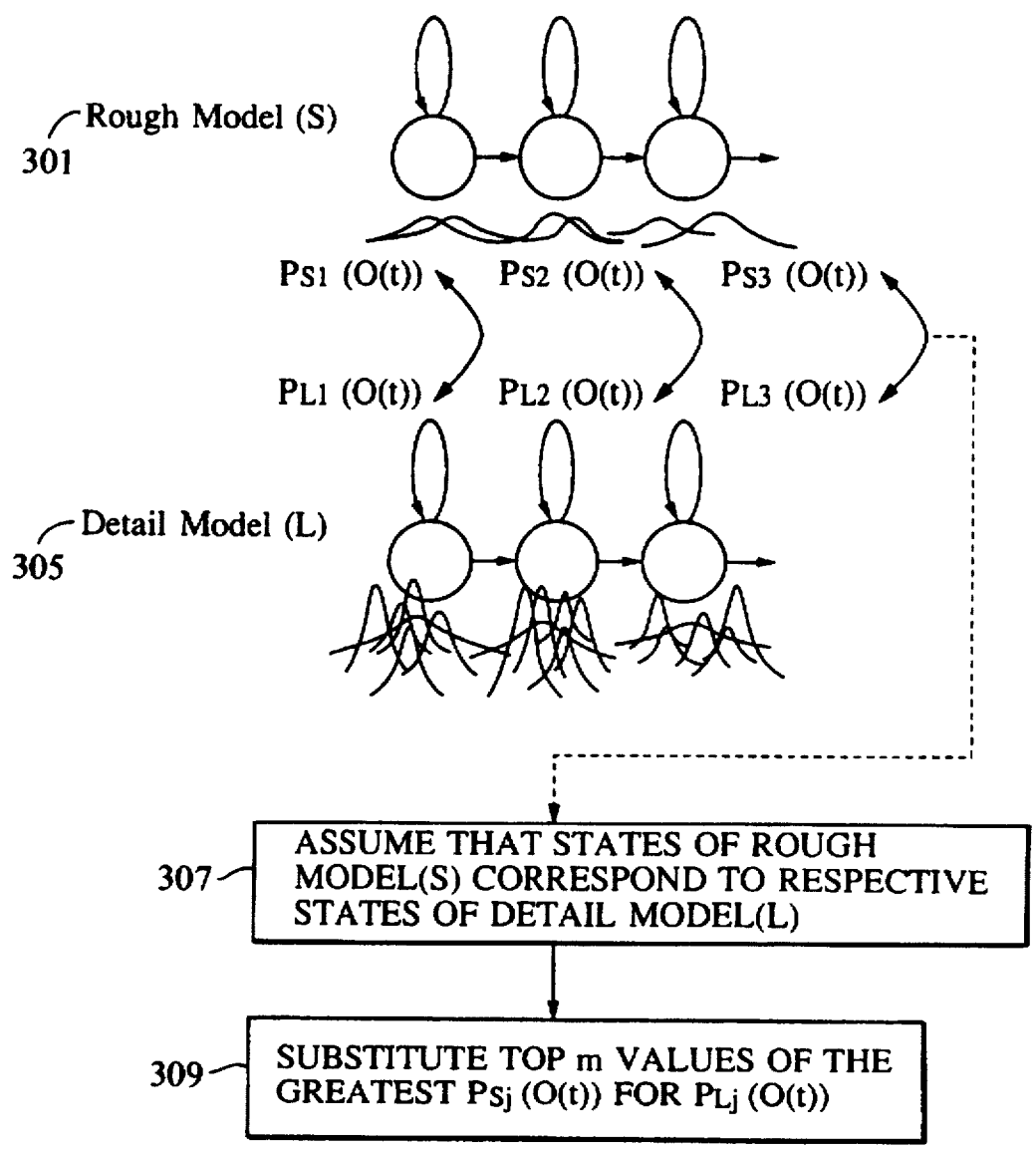
FIG. 3 shows a state diagram of the first embodiment.

If the aforementioned assumption is established, as indicated by element 307 of FIG. 3 the following method can be employed for the output probability computation. The output probabilities are first determined using the small number of mixture HMMs (rough model 301 of FIG. 3). As a result, the states of the HMM which have the highest output probabilities and are thus likely to contribute to the recognition results are estimated. The output probabilities are re-determined by use of the states of the large number of mixture HMM (detail model 305) corresponding to the states of the HMM estimated by the previous calculations. On the other hand, for the states which are not re-determined by use of the large number of mixture HMM, the estimated output probabilities obtained by use of the small number of mixture HMM can be copied as the output probabilities.

Figure 4:
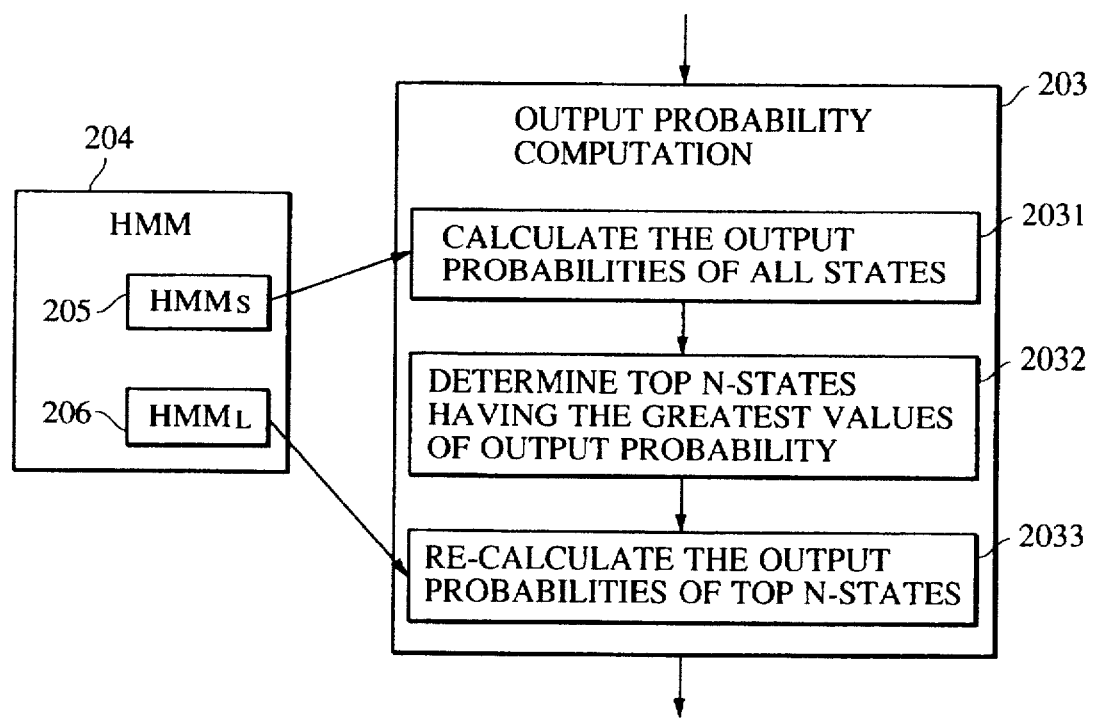
FIG. 4 illustrates the process of output probability computation method according to the first embodiment.

A specific process of the output probability determination is illustrated below. The state diagram of the process is illustrated in FIG. 3, and the flow of the recognition process is illustrated in FIG. 4.

Training Process

Two types of HMMs having different number of mixtures (a small number of mixture $HMM_s$ and a large number of mixture $HMM_L$) of each phoneme are independently trained according to the well known EM-algorithm using the sound database (phonemic labels and feature parameters). The mixture number of the small number of mixture $HMM_s$ of the rough model 301 is indicated by s, while the mixture number of the large number of mixture $HMM_L$ of the detailed model 305 is represented by l (s<l). The structures of the two types of HMMs (for example, n-state n-loop, n=3 in this embodiment) are identical.

Recognition Process

The output probabilities of all the states J (J=M·n) of all the phonemes (for example, M phonemes) are calculated with respect to the feature parameter O(t) at time t. In other words, the output probability $P_j(O(t))$ of each state j (j=1, 2, ..., J) is determined (step 2031). More specifically, the output probability of the state j can be determined by processing the output probability represented by $P_{Sj}(O(t))$ using the state (j) of the small number of mixture $HMM_S$.

It is assumed that the top N states having the highest output probabilities $P_{Sj}(O(t))$ of the rough model 301 will contribute to the recognition results, and the states j corresponding to the highest N output probabilities are determined (step 2032).

Then, the output probabilities $P_{Lj}(O(t))$ of the detailed model 305 are calculated by use of only the states j of the large number of mixture $HMM_L$ corresponding to the states j determined by the previous calculations (step 2033).

The N output probabilities $P_{Lj}(O(t))$ obtained by the large number of mixture $HMM_L$ of the detailed model 305 are substituted for the corresponding probabilities $P_{Sj}(O(t))$ (element 307 of FIG. 3) and the J-N output probabilities $P_{Sj}(O(t))$ other than the N output probabilities $P_{Lj}(O(t))$ obtained by the small number of mixture $HMM_s$ of the rough model 301 are employed as the final output probability $P_j(O(t))$ of each state (j). By use of this final output probability $P_j(O(t))$, recognition processing is executed. Thus, the total number of mixtures C provided for calculations can be determined by the following equation:

$$C = M \cdot n \cdot s + N \cdot l$$

For example, according to the conventional recognition method employed by only one type of HMM, three states and two mixtures in each state (a total number of 900 mixtures) are used to achieve 79.0% of the top 1 sentence recognition accuracy, or three states and eighteen mixtures in each state (a total number of 1350 mixtures) are used to achieve 81.0% of the top 1 sentence recognition accuracy. In contrast, according to this embodiment, when three states and four mixtures are used for the first estimation, and then, the output probabilities of ten states are determined by use of three states and eighteen mixtures, the recognition accuracy substantially similar to those according to the conventional method can be obtained with a reduction of the total number of mixtures to 480. Also, when three states and six mixtures are used for the first estimation, and then, when the output probabilities of ten states are determined using three states and twenty-four mixtures, the recognition accuracy substantially similar to those according to the conventional method can be obtained with a reduction of the total number of mixtures to 690. Consequently, according to the method of the present invention, the amount of output probability processing can be reduced to nearly one half of the processing required for the conventional method, both methods exhibiting substantially similar rates of recognition accuracy.

Although this embodiment has been explained in which all the HMMs are formed of three states by way of example, the present invention is not limited to three states in each HMM, and instead, the number of states may be around three or four as long as the resulting number of determinations is suitable and a reasonably good rate of recognition accuracy can be obtained.

Also, this embodiment employs only two types of HMMs, that is, a rough HMM having a smaller number of mixtures and a detailed HMM having a larger number of mixtures.

However, a plurality of types of HMMs having different number of mixtures may be employed.

In this embodiment, the output probabilities are calculated in two stages since the two types of HMMs, the rough HMM and the detailed HMM are used. However, when a plurality of types of HMMs are used as described above, the output probabilities may be redetermined in a plurality of stages in accordance with the number of types of HMMs.

Further, in this embodiment, since the two types of HMMs, that is, the rough HMM and the detailed HMM, are employed, redeterminations of the output probabilities are made only of the top N states having the highest output probabilities. However, if a plurality of types of HMMs, for example, a rough HMM, a comparatively-detailed HMM, and a more detailed HMM, are employed, the following processing stages may be used. Namely, the output probabilities of all the states may first be determined by use of the rough HMM. Then, the output probabilities of a range from the top A states to the top B states (A<B) (B–A+1) having the highest output probabilities obtained by the previous determinations may be redetermined by the comparatively-detailed HMM. The output probabilities of the top (A-1) states may be similarly redetermined by use of the more detailed HMM. According to this process in a plurality of stages, the most precise output probability can be achieved.

When a plurality of types of HMMs, that is, a rough HMM, a comparatively-detailed HMM, and a more detailed HMM, are used, the following computation stages may be used alternatively. The output probabilities of all the states may first be determined by use of the rough HMM. Then, the output probabilities of the top B states having the highest output probabilities obtained by the previous determinations may be redetermined by use of the comparatively-detailed HMM. Further, the output probabilities of the top A states (A<B) having the highest output probabilities obtained by the previous redeterminations may be once again determined by use of the more detailed HMM. Recognition processing may thus be executed according to the resulting output probabilities obtained by the respective types of HMMs.

Second Embodiment

Figure 5:
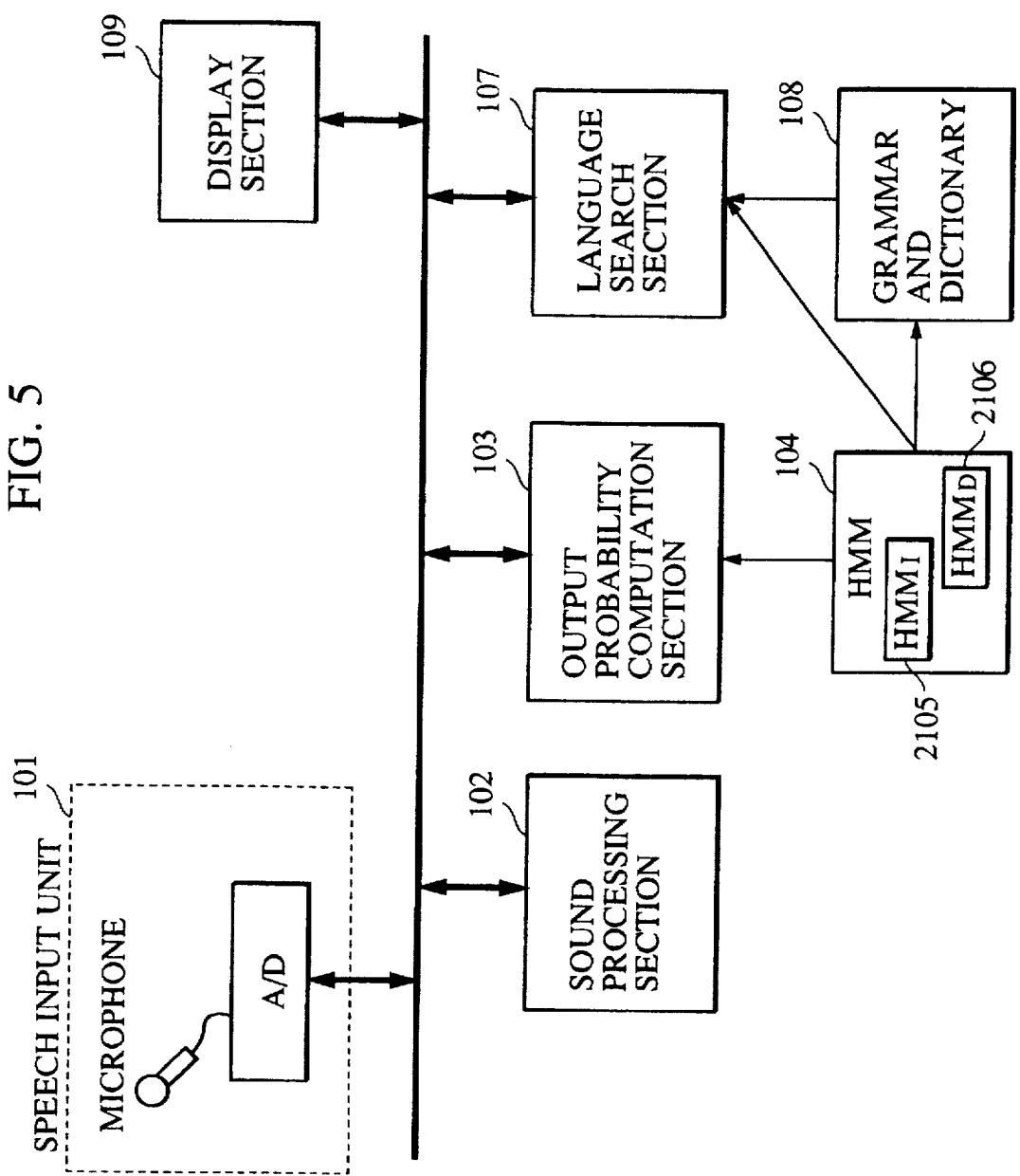
FIG. 5 is a block diagram illustrating a second embodiment of the present invention.

FIG. 5 is a schematic view illustrating a speech recognition system according to a second embodiment of the present invention. The same elements as described in the first embodiment are designated by like reference numerals, and an explanation thereof will thus be omitted.

The speech recognition system of this embodiment differs from the system of the previous embodiment in the construction of the HMM storing section 104. The HMM storing section 104 of this embodiment includes a $HMM_I$, storing portion 2105 in which phonemic context-independent HMMs, that is, $HMM_I$s are stored, for estimating how much a phoneme will contribute to the recognition of the input voice, and a $HMM_D$ storing portion 2106 in which phonemic context-dependent HMMs, that is, $HMM_D$s, are stored for determining the precise output probabilities.

Figure 6:
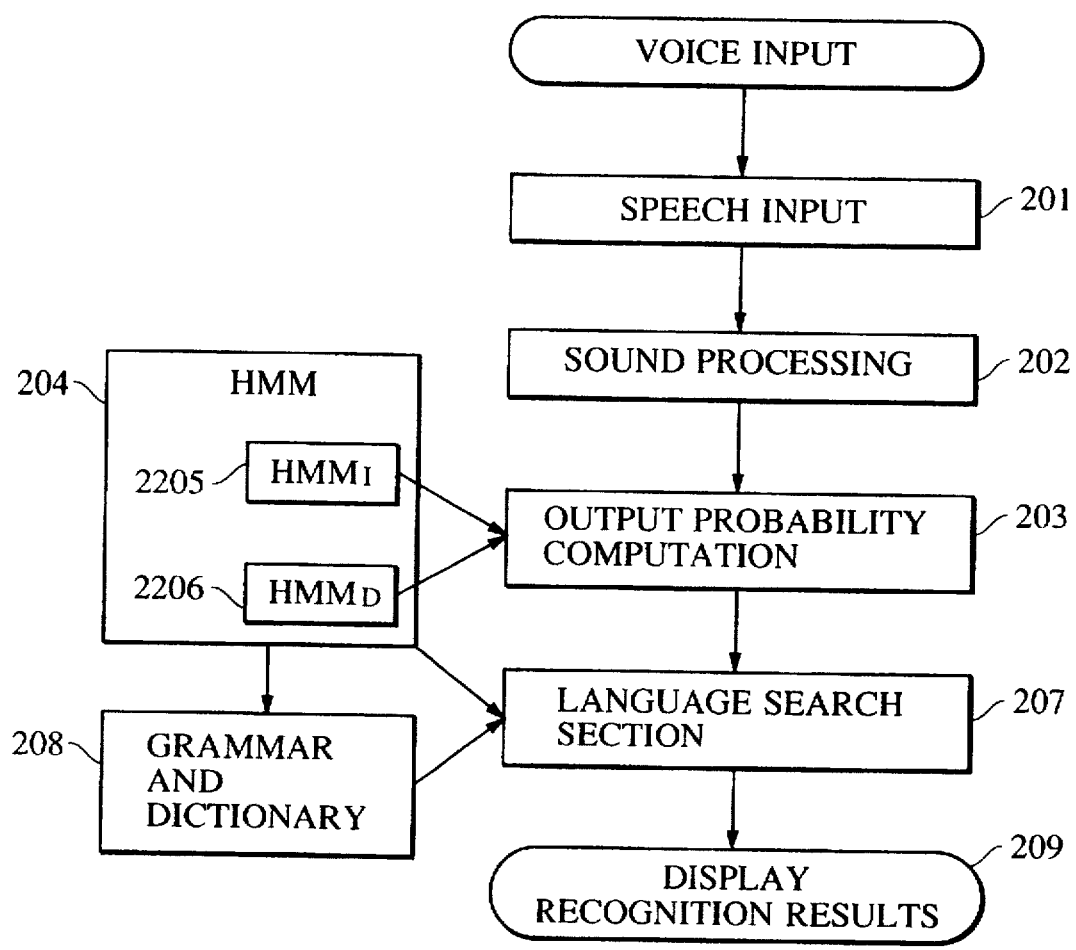
FIG. 6 is a flow chart of a process executed in the second embodiment.

The speech recognition system constructed as described above is operated according to the flow shown in FIG. 6. The same steps as those shown in FIG. 2 for executing a recognition process are also designated like reference numerals, and an explanation thereof will thus be omitted. The output probabilities are first determined in the output probability computation section 103 (step 203) by use of the phonemic context-independent $HMM_I$, stored in the $HMM_I$, storing portion 2105 of the HMM storing section 104 (step 2205 in 204). Further, the states of the HMMs which are likely to contribute to the recognition results are determined.

The precise output probabilities are redetermined by use of a phonemic context-dependent $HMM_L$ stored in the $HMM_D$ storing portion 2106 corresponding to the states which have been determined to contribute to the recognition results in step 2205 (step 2206). According to the thus-obtained precise output probabilities, the language processing is performed in the language search section 107 (step 207) by use of the grammar and the dictionary stored in the grammar and dictionary section 108 (step 208) which further determine the candidate for input speech. Finally, the recognition results are output to the display section 109 (step 209).

The second embodiment will now be described in more detail.

In this embodiment, phonemes which are likely to contribute to the recognition results are estimated by use of the phonemic context-independent HMMs. Then, only the output probabilities of the estimated phonemes are redetermined by use of the phonemic context-dependent HMMs which achieve high recognition accuracy. As a consequence, the total number of mixtures provided for actual processing can be reduced, thereby achieving faster speech recognition processing.

In this embodiment, as well as the first embodiment, the HMMs each formed of three states are employed for the reason similar to that given for the first embodiment.

Figure 7:
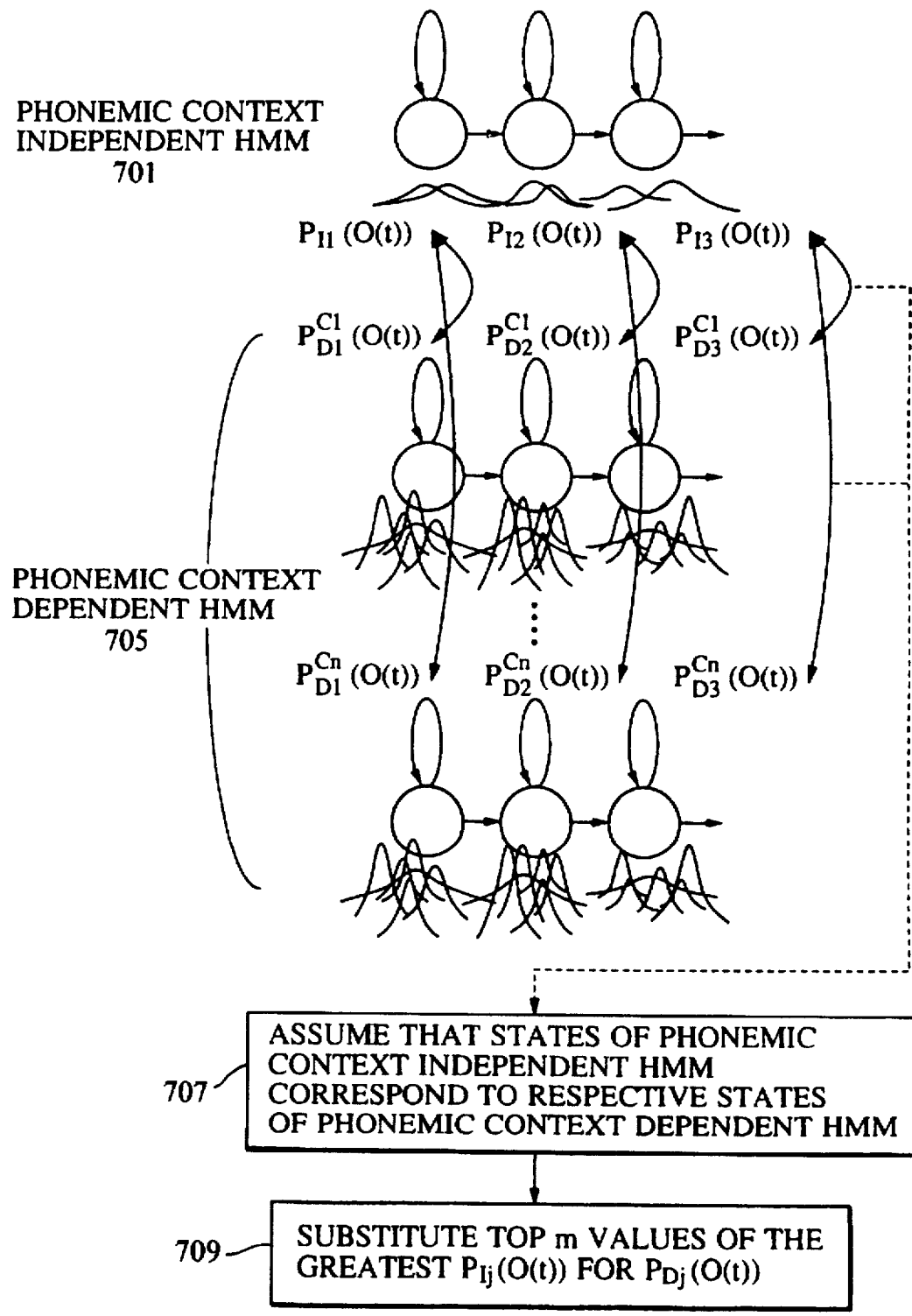
FIG. 7 shows a state diagram of the second embodiment.
Figure 8:
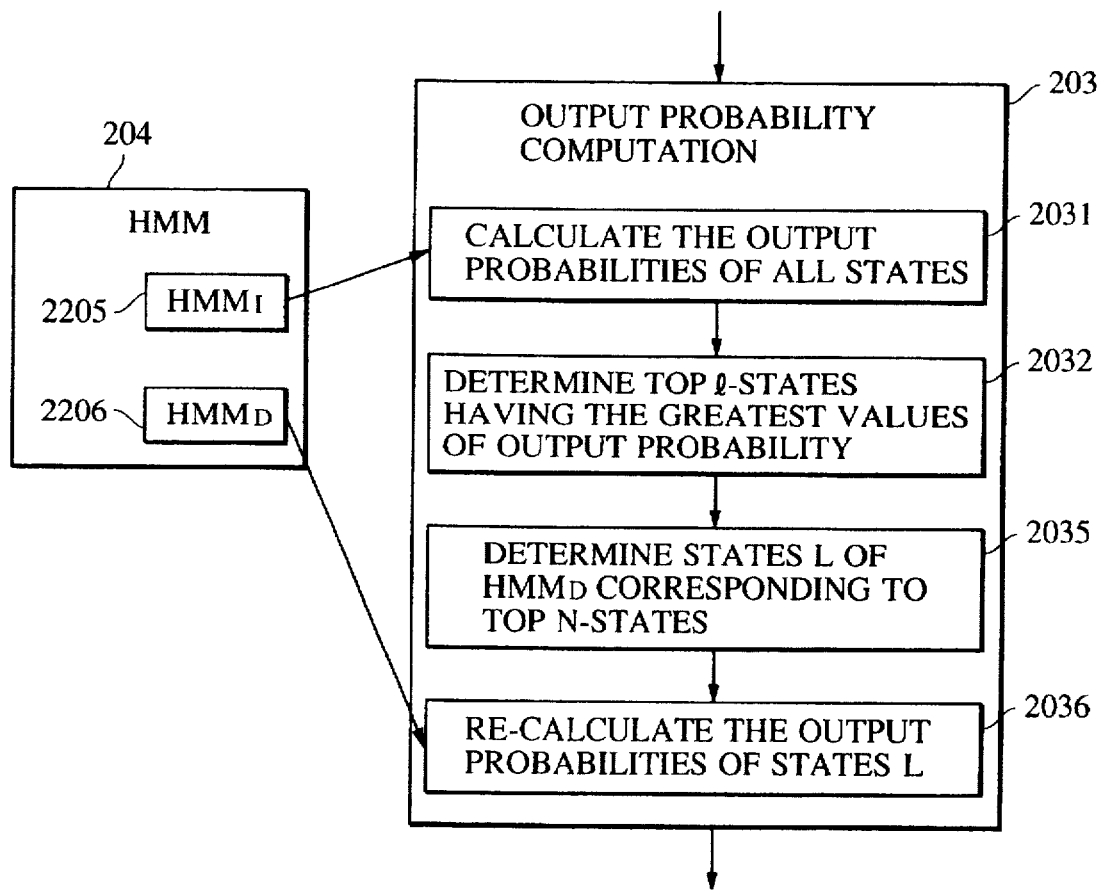
FIG. 8 illustrates the process of output probability formation according to the second embodiment.

A specific process is shown below. The state diagram of the process is illustrated in FIG. 7, and the recognition flow using this algorithm is shown in FIG. 8.

Training Process

By use of a sound database (phonemic labels and feature parameters, and phonemic context-dependent labels and feature parameters), phonemic context-independent $HMM_I$s (m models) and phonemic context-dependent $HMM_D$ (M models) (m<<M) are independently trained according to the EM-algorithm. The structures of the two types of HMMs (for example, n-state n-loop, n=3 in this embodiment) are identical.

Recognition Process

The output probabilities of all the states j (j=n·m) of all the phonemes (for example, m phonemes) are determined with respect to the feature parameters O(t) at time t. In other words, the output probability $P_i(O(t))$ of each state i (i=1, 2, ..., j) is determined (step 2031). The number of all the states of the phonemic context-dependent HMMs 705 (M models) is k=nM states (j<<k).

More specifically, the output probability $P_i(O(t))$ of the state i can be determined by determining the output probability represented by $P_{Ii}(O(t))$ using the state (i) of the phonemic context-independent $HMM_I$ 701 under the assumption of element 707 that the states of the phonemic context independent HMM correspond to the respective states of the phonemic context-dependent HMMs.

It is assumed that the top l states (l≧1) (l<j) having the highest output probabilities $P_{Ii}(O(t))$ will contribute to the recognition results, and the states i corresponding to the highest l output probabilities are determined (step 2032).

Then, the states L (p output probabilities, k≧ℓp ≧l) of the phonemic context-dependent $HMM_D$ 705 corresponding to the states i obtained by the previous determinations are determined (step 2035). For determining the states L, consideration is only given to the phonemic context-dependent $HMM_D$ 705 which will be verified against the grammar and dictionary data for language search processing.

The output probabilities $P_{DL}(O(t))$ are determined by use of only the states L of the phonemic context-dependent $HMM_D$ 705 (step 2036).

The p output probabilities $P_{DL}(O(t))$ obtained by the phonemic context-dependent $HMM_D$ 705 and the k-p output probabilities other than the p output probabilities are employed as the final output probability $P_i(O(t))$. By use of this final output probability $P_i(O(t))$, recognition processing is executed. It should be noted that the k–p output probabilities can be obtained by substituting the output probabilities $P_{ij}(O(t))$ obtained by the phonemic context-independent HMM, 701, for the output probabilities of the states of the phonemic context-dependent HMM corresponding to the states of the output probabilities $P_{ij}(O(t))$ as indicated in element 709. Accordingly, the total number of mixtures C provided for determinations can be determined by the following equation:

$$C = i + p(C << k)$$

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A speech recognition method for performing speech recognition by use of continuous mixture HMMs for output probability determination, said HMMs being in a same class including a first type of HMM having a small number of mixtures and a second type of HMM having a large number of mixtures, said first type of HMM having the same number of states as said second type of HMM, said method comprising the steps of:

determining a first type of output probabilities with respect to input speech by use of said first type of HMM having the small number of mixtures;

selecting states in which said determined output probabilities are high;

determining a second type of output probabilities of said selected states with respect to said input voice by use of said second type of HMM having the large number of mixtures;

substituting the second type of output probabilities for the first type of output probabilities; and recognizing said input speech in accordance with the first type of output probabilities which are not substituted and the second type of output probabilities which are substituted.

2. A speech recognition method according to claim 1, wherein results of the speech recognition are output on a display section.

3. A speech recognition method according to claim 1, wherein speech input through a microphone is to be recognized.

4. A speech recognition method using continuous mixtures HMMs for output probability processing, said HMMs being in a same class including at least two types of HMMs, a rough HMM requiring only a small number of probability determinations and a detailed HMM, said rough type of HMM having the same number of states as said detailed HMM, said method comprising the steps of:

determining output probabilities of each state by use of said rough HMM; and redetermining the output probabilities of selected states which are likely to contribute to the recognition results by use of said detailed HMM.

5. A speech recognition method according to claim 4, wherein said rough HMM is formed of a small number of mixtures and said detailed HMM is formed of a large number of mixtures.

6. A speech recognition method according to claim 4, wherein said rough and detailed HMMs are constructed in a similar manner, and states of said rough HMM correspond to states of said detailed HMM, and the output probabilities of the respective states in said rough HMM are exchangeable with the output probabilities of the respective states of said detailed HMM.

7. A speech recognition method according to claim 4, wherein said states which are likely to contribute to the recognition results are top N states having highest output probabilities determined by said rough HMM or states whose output probabilities are in a range from a threshold to the highest output probability.

8. A speech recognition method according to claim 4, wherein top M states having the highest probabilities determined by said rough HMM are determined to contribute to the recognition results, the output probabilities of said states being determined by said detailed HMM, and top N states having the highest probabilities determined by said detailed HMM (N<M) are similarly determined by use of a more detailed HMM so as to obtain more precise output probabilities in another step.

9. A speech recognition method according to claim 4, wherein the output probabilities of from top N states to top M states (N<M) having the highest output probabilities determined by said rough HMM are redetermined by use of a comparatively-detailed HMM, and the top N states are similarly redetermined by use of a more detailed HMM, thereby obtaining more precise output probabilities in two steps.

10. A speech recognition method according to claim 4, wherein the output probabilities obtained by said rough HMM are used for the output probabilities which are not redetermined.

11. A speech recognition method according to claim 4, wherein results of the speech recognition are output on a display section.

12. A speech recognition method according to claim 4, wherein speech input through a microphone is to be recognized.

13. A speech recognition method for performing speech recognition by use of continuous mixture HMMs for output probability processing, said HMMs being in a same class including a phonemic context-independent HMM and a phonemic context-dependent HMM, said phonemic context-independent HMM having the same number of states as said phonemic context-dependent HMM, said method comprising the steps of:

determining a first type of output probabilities with respect to input speech by use of said phonemic context-independent HMM;

selecting states in which said determined output probability is high;

determining a second type of output probabilities of said selected states with respect to said input speech by use of said phonemic context-dependent HMM;

substituting the second type of output probabilities for the first type of output probabilities; and recognizing said input speech in accordance with the first type of output probabilities which are not substituted and the second type of output probabilities which are substituted.

14. A speech recognition method according to claim 13, wherein results of the speech recognition are output on a display section.

15. A speech recognition method according to claim 13, wherein speech input through a microphone is to be recognized.

16. A speech recognition method using continuous mixtures HMMs for output probability computation, said HMMs being in a same class including at least two types of HMMs, a phonemic context-independent HMM and a plurality of phonemic context-dependent HMMs whose phonemes depend on the phonemic context, said phonemic context-independent HMM and said phonemic context-dependent HMMs having the same number of states, said method comprising the steps of:

determining a first type of output probabilities of each state by use of said phonemic context-independent HMM; and redetermining a second type of output probabilities of selected states which are likely to contribute to recognition results by use of said phonemic context-dependent HMMs.

17. A speech recognition method according to claim 16, wherein said two types of HMMs are constructed in a similar manner, and states of one type of HMM corresponds to states of the other type of HMMs, and the output probabilities of the respective states in one type of HMM are exchangeable with the output probabilities of the respective states in the other type of HMM.

18. A speech recognition method according to claim 16, wherein said states which are likely to contribute to the recognition results are top N states having highest output probabilities determined by one of said phonemic context-independent HMM and states whose output probabilities are in a range from a threshold to the highest output probability.

19. A speech recognition method according to claim 16, wherein the top N states having the highest output probabilities determined by said phonemic context-independent HMM are determined to contribute to the recognition results.

20. A speech recognition method according to claim 16, wherein the phonemic context-dependent HMMs provided for output probability redeterminations are based on information of a grammar and dictionary section and the output probabilities of said HMMs are determined when they undergo language search.

21. A speech recognition method according to claim 16, wherein the output probabilities obtained by said phonemic context-independent HMM are used for the output probabilities which are not redetermined.

22. A speech recognition method according to claim 16, wherein results of the speech recognition are output on a display.

23. A speech recognition method according to claim 16, wherein speech input through a microphone is to be recognized.

24. A speech recognition apparatus comprising:

means for inputting a speech pattern;

means for storing signals corresponding to a first type of continuous mixture Hidden Markov Model having a first number of mixtures and signals corresponding to a second type of continuous mixture Hidden Markov Model having a second larger number of mixtures, said first type of continuous mixture Hidden Markov Model having the same number of states as the second type of continuous mixture Hidden Markov Model;

processing means for forming first output probability signals for the input speech using the first type Hidden Markov Model signals and for selecting states in which said determined output probabilities are high;

processing means for forming second output probability signals of the selected states for the input speech using the second type Hidden Markov Model signals;

means for substituting the second output probability signals for the first output probability signals; and means responsive to the first output probability signals which are not substituted and second output probability signals which are substituted for recognizing the input speech.

25. Apparatus for recognizing speech using continuous mixtures HMMs for output probability processing, the HMMs being of a same class including at least two types of HMMs, a rough HMM requiring only a small number of probability determinations and a detailed HMM, said rough type of HMM having the same number of states as said detailed HMM, the apparatus comprising:

determining means for determining output probability signals of each state using of the rough HMM; and redetermining means for redetermining the output probability signals of selected states which are likely to contribute to the recognition results using the detailed HMM.

26. Apparatus for recognizing speech using continuous mixture HMMs for output probability processing, the HMMs being in a same class including a phonemic context-independent HMM and a phonemic context-dependent HMM, said phonemic context-independent HMM having the same number of states as said phonemic context-dependent HMM, the apparatus comprising:

determining means responsive to input speech for determining a first type of output probabilities using the phonemic context-independent HMM;

selecting means for selecting states in which said determined output probability of the first type of output probabilities is high;

determining means for determining a second type of output probabilities of the selected states with respect to the input speech using the phonemic context-dependent HMM;

substituting means for substituting the second type of output probabilities for the first type of output probabilities; and recognizing means for recognizing the input speech in accordance with the first type of output probabilities which are not substituted and the second type of output probabilities which are substituted.

27. Apparatus for recognizing speech using continuous mixture HMMs for output probability computation, the HMMs being in a same class including at least two types of HMMs, a phonemic context-independent HMM and a plurality of phonemic context-dependent HMMs having phonemes depending on phonemic context, said phonemic context-independent HMM and said phonemic context-dependent HMMs having the same number of states, the apparatus comprising:

determining means for determining a first type of output probabilities of each state using the phonemic context-independent HMM; and redetermining means for redetermining a second type of output probabilities of selected states which are likely to contribute to recognition results using the phonemic context-dependent HMMs.

\* \* \* \* \*

UNITED STATES PATENT AND TRADEMARK OFFICE
CERTIFICATE OF CORRECTION

PATENT NO. : 5,787,396

DATED : July 28, 1998

INVENTORS : YASUHIRO KOMORI, ET AL.

It is certified that error appears in the above-identified patent and that said Letters Patent is hereby corrected as shown below:

COLUMN 1,
Line 14, "a" should read --an--.
Line 29, "HMMs)," should read --HMMs"),--.

COLUMN 2,
Line 13, "a" should read --an--.
Line 17, "a" should read --an--.
Line 60, "HMMS" should read --HMMs--.

COLUMN 4,
Line 22, "$HMM_s$  " should read --$HMM_s$s--.
Line 25, "$HMM_L$s," should read --$HMM_L$s--.
Line 38, "a" should read --an--.
Line 40, "phoneme" should read --phonemes--.

COLUMN 5,
Line 37, "FIG. 3" should read --FIG. 3,--.
Line 57, "number" should read --numbers--.

UNITED STATES PATENT AND TRADEMARK OFFICE
CERTIFICATE OF CORRECTION

PATENT NO. : 5,787,396

DATED : July 28, 1998

INVENTORS : YASUHIRO KOMORI, ET AL.

It is certified that error appears in the above-identified patent and that said Letters Patent is hereby corrected as shown below:

COLUMN 7,
Line 2, "number" should read --numbers--.
Line 49, "a $HMM_I$," SHOULD READ --an $HMM_I$--.

Signed and Sealed this

Thirty-first Day of August, 1999

Attest:

Q. TODD DICKINSON

*Attesting Officer*         *Acting Commissioner of Patents and Trademarks*